(12) United States Patent
Cardwell et al.

(10) Patent No.: US 8,269,606 B2
(45) Date of Patent: Sep. 18, 2012

(54) METHODS AND SYSTEMS FOR RFID TAG READ VERIFICATION

(75) Inventors: Gaylen Kenneth Cardwell, St. Peters, MO (US); Donald Lee Murray, Highland, IL (US); Gary D. Koval, Troy, IL (US); Brian N. Slack, Lebanon, IL (US)

(73) Assignee: The Boeing Company, Chicago, IL (US)

( * ) Notice: Subject to any disclaimer, the term of this patent is extended or adjusted under 35 U.S.C. 154(b) by 1294 days.

(21) Appl. No.: 11/743,526

(22) Filed: May 2, 2007

(65) Prior Publication Data

US 2008/0272888 A1  Nov. 6, 2008

(51) Int. Cl.
*H04Q 5/22* (2006.01)

(52) U.S. Cl. ........................ 340/10.1; 340/5.92; 705/28

(58) Field of Classification Search .............. 340/10.1, 340/5.92, 572.1, 572.4; 705/28
See application file for complete search history.

(56) References Cited

U.S. PATENT DOCUMENTS

| | | | |
|---|---|---|---|
| 5,963,134 A * | 10/1999 | Bowers et al. | 340/572.1 |
| 6,417,760 B1 * | 7/2002 | Mabuchi et al. | 340/5.3 |
| 6,456,239 B1 | 9/2002 | Werb et al. | |
| 6,554,187 B2 | 4/2003 | Otto | |
| 6,600,418 B2 | 7/2003 | Francis et al. | |
| 6,859,757 B2 | 2/2005 | Muehl et al. | |
| 6,909,356 B2 * | 6/2005 | Brown et al. | 340/5.2 |
| 6,970,088 B2 | 11/2005 | Kovach | |
| 7,047,159 B2 | 5/2006 | Muehl et al. | |
| 7,117,374 B2 | 10/2006 | Hill et al. | |
| 7,118,029 B2 | 10/2006 | Nycz et al. | |
| 2001/0042786 A1 | 11/2001 | Reynolds et al. | |
| 2002/0038267 A1 | 3/2002 | Can et al. | |
| 2002/0167406 A1 | 11/2002 | Garber et al. | |
| 2003/0101108 A1 * | 5/2003 | Botham et al. | 705/28 |
| 2003/0102970 A1 * | 6/2003 | Creel et al. | 340/568.1 |
| 2003/0189094 A1 | 10/2003 | Trabitz | |
| 2004/0118916 A1 | 6/2004 | He | |
| 2004/0124982 A1 | 7/2004 | Kovach | |
| 2004/0257202 A1 | 12/2004 | Coughlin et al. | |
| 2005/0021283 A1 | 1/2005 | Brinton et al. | |
| 2005/0029350 A1 | 2/2005 | Jusas et al. | |
| 2005/0040231 A1 | 2/2005 | Allison et al. | |
| 2005/0145187 A1 | 7/2005 | Gray | |
| 2005/0248454 A1 | 11/2005 | Hanson et al. | |
| 2006/0015408 A1 | 1/2006 | Brown | |
| 2006/0038077 A1 | 2/2006 | Olin et al. | |
| 2006/0054691 A1 | 3/2006 | Holloway et al. | |
| 2006/0097876 A1 * | 5/2006 | Retali et al. | 340/572.1 |
| 2006/0145855 A1 | 7/2006 | Diorio et al. | |
| 2006/0163430 A1 | 7/2006 | Cordina et al. | |
| 2006/0180647 A1 | 8/2006 | Hansen | |
| 2006/0186201 A1 | 8/2006 | Hart | |
| 2006/0192003 A1 | 8/2006 | Chung | |
| 2006/0220857 A1 | 10/2006 | August et al. | |

(Continued)

*Primary Examiner* — Edwin Holloway, III

(74) *Attorney, Agent, or Firm* — Armstrong Teasdale LLP

(57) ABSTRACT

A method for operating an RFID tag read verification system is described where the system includes at least one RFID reader and antenna assembly and a computing device. The method includes importing a control file, including data relating to a plurality of RFID tagged items that collectively form an RFID tagged environment, into the computing device, scanning the RFID tagged environment utilizing the one or more RFID reader and antenna assemblies, transferring scan data of the RFID tag environment from the one or more RFID reader and antenna assemblies to the computing device, and utilizing the computing device to compare the scan data to the control file to identify any anomalies within the RFID tagged environment.

29 Claims, 3 Drawing Sheets

U.S. PATENT DOCUMENTS

2007/0008138 A1 1/2007 Mosher, Jr. et al.
2007/0008140 A1 1/2007 Saarisalo et al.
2007/0018826 A1 1/2007 Nowak et al.

* cited by examiner

METHODS AND SYSTEMS FOR RFID TAG READ VERIFICATION

BACKGROUND OF THE INVENTION

This invention relates generally to RFID tag utilization, and more specifically, to methods and systems for RFID tag read verification.

RFID tags and readers have been utilized in a multitude of applications. In a typical application, once an RFID reader-antennae assembly has read a single or many RFID tags, it keeps a record of those reads (e.g., tag number, date and time, the tag specification, and the specific antenna that made the read); however, the reader can only store the data until the unit is shut down. RFID readers have the capability of reading hundreds of RFID tags per second. As the tags are read, a record is kept of each read. For the data to be retained, it has to be output to an external system prior to the system being powered down or turned off.

A problem with the above described process is that, as the number of unique tags read grows beyond a dozen or two, it is not possible to very quickly identify which tags were read, and which tags were not read, to verify the accuracy of RFID tagging and reading processes. More specifically, known RFID tag and reader systems are not believed to have a capability to compare imported (read) data with known RFID tag identifiers, locations, and control data (e.g., (tagged items data)).

To date, in order to verify which RFID tags incorporated within a system were read, and not read, copious hand-written notes have been utilized. The notes, along with the text string output of the records stored in the RFID tag reader, are then manually deciphered to determine if the desired reads took place. Such manually driven processes are known to be time-extensive and prone to errors.

BRIEF DESCRIPTION OF THE INVENTION

In one aspect, a method for operating a RFID tag read verification system is provided where the system includes at least one RFID reader and antenna assembly and a computing device. The method includes importing a control file, including data relating to a plurality of RFID tagged items that collectively form an RFID tagged environment, into the computing device, scanning the RFID tagged environment utilizing the one or more RFID reader and antenna assemblies, transferring scan data of the RFID tag environment from the one or more RFID reader and antenna assemblies to the computing device, and utilizing the computing device to compare the scan data to the control file to identify any anomalies within the RFID tagged environment.

In another aspect, an RFID tag read verification system is provided that includes at least one RFID reader and antenna assembly operable to scan an RFID tagged environment to generate scan data and a computing device. The computing device includes a control file and is operable to communicate with the one or more RFID reader and antenna assemblies. The control file includes data descriptive of the RFID tagged environment, and the system is operable to compare the scan data received from the at least one RFID reader and antenna assembly to the control file data to provide a status for the RFID tagged environment.

DETAILED DESCRIPTION OF THE INVENTION

Herein described are methods and systems for receiving and processing RFID tag reader output to provide useable information directed to one or more specific applications. The function of the described RTRV system is to provide fast and accurate verification of RFID tag reads as reported by an RFID reader and measured against a previously built control file and to provide inspection alerts as indicated at the time the RFID tags are read and compared to the control file.

For example and in one embodiment, RFID reader-antennae assembly read data is parsed into information from which the user can create sub-sets of the data by tag type, items tagged, tags read, not read, etc. The parsed data is further available to generate reports that create a tangible record of tag reads. Such reports and records may provide insight to the user in determining the optimal placement of a tag on an item. Once the data is parsed and manipulated into subsets, output from the system provides a user with one or more of all RFID tags that should have been read by comparing what was read with a pre-loaded control file, an indication of what RFID tags in the control file were not read, and a summary of the tags that were read but which where not in the control file.

Figure 1:
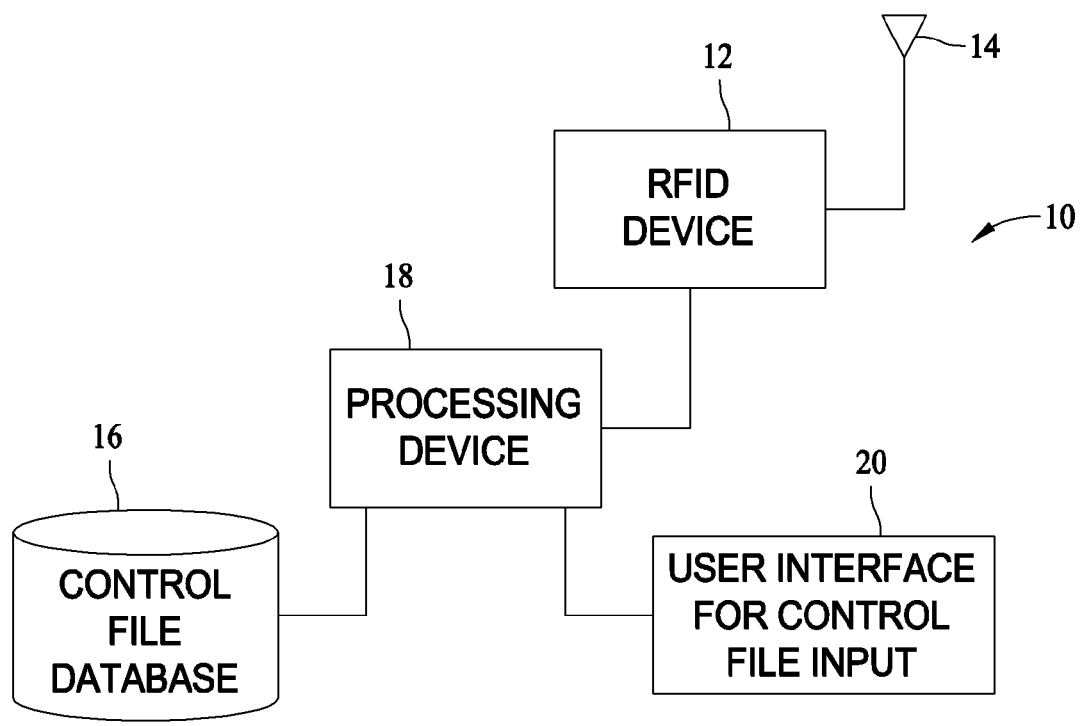
FIG. 1 is a functional block diagram of a RFID tag read verification (RTRV) system.

In other words, the RFID tag read verification (RTRV) system 10 described herein and illustrated in FIG. 1 provides a capability to give a complete RFID tag overview for the specific environment in which one or more RFID readers 12 and associated antenna assemblies 14 are utilized. In one embodiment, RTRV system 10 incorporates and utilizes a control file, for example stored within a database 16, that can be configured in practically any number of ways. In a particular embodiment, database 16 is a Microsoft Access database from MICROSOFT CORPORATION of Redmond, Wash. Access to database 16 and data to and from RFID reader 12 is controlled using a processing device 18, which in an embodiment is a part of the Microsoft Access application of database 16 as further described below. Updates to the control file in database 16, or other updates to system 10 may be entered utilizing user interface 20, which in one embodiment, is built into processing device 18. In a specific embodiment, and as further described below, data from other databases or from spreadsheets may be imported into system 10, utilizing the functionality associated with user interface 20 and processing device 18. In an exemplary embodiment, processing device 18 is a laptop or other personal computer that has Microsoft Access installed. In one specific embodiment utilizing system 10, it has been demonstrated that any item, that has an inspection date listed in the control file, can be highlighted by RTRV System 10, when the RFID tag associated with that item is read by RFID reader 12 via antenna assembly 14. Thus, RTRV system 10 can indicate for a particular tagged item, for example, if inspection is past due, is now due, about to be due, or won't be due for some time.

In a specific embodiment, system 10 includes a simple, yet robust, database 16 that allows a user to create, either manually or via import, control data and also import data from an RFID reader 12. An example of imported control data is data from a spreadsheet application. System 10 is configured such that a user can create a control file that includes enough data to thoroughly test the readability of a number of RFID tags and RFID tag designs. Such tags may be provided by multiple vendors, applied to nearly any item, attached in one of multiple positions on the item, and utilized in nearly any environment.

In one embodiment, RTRV system 10 is configured for the translation of comma delimited read records created by RFID reader 12. The control file of data stored in database 16 can be repeatedly tested allowing for the exchange of tags and repositioning of tags. Such tests may be utilized to determine an optimal tag type and position of the tag on an item for reading by reader 12. System 10 further allows a user to create archival and reporting capabilities that allow full and complete documentation of the tests and demonstrations.

Figure 2:
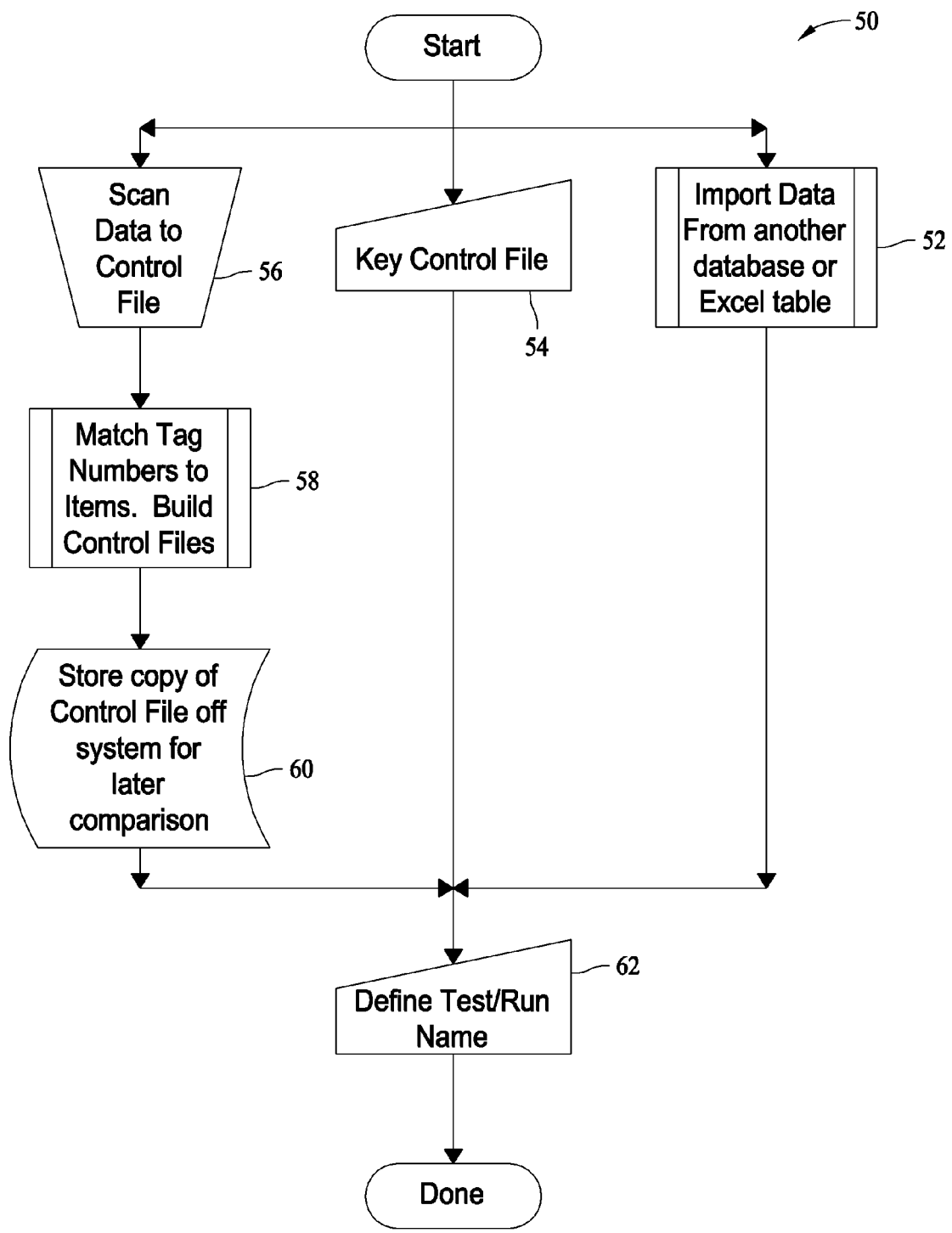
FIG. 2 is a flowchart illustrating various ways to input data into a control file.

To further illustrate, FIG. 2 is a flowchart 50 illustrating various processes that can be utilized to generate data for storage as a control file within database 16. Data for control files can either be imported 52 from another database or spreadsheet application, manually keyed 54 into system 10 using user interface 20, or built up using scans 56 of RFID tags within a defined area or environment. When the scan data is sent to control file database 16, numbers of the individual RFID tags are matched 58 to the items with which they are associated. A copy of the created control file is stored 60 in database 16 for use in comparison against later RFID tag scans. Each control file whether imported, manually keyed in, built up from RFID tag scans, or a combination thereof, is defined 62 with a name for later retrieval. As multiple control files might be stored within system 10, an individual control file name is entered or selected by the user when prepared to initiate a specific inventory of RFID tagged items.

Figure 3:
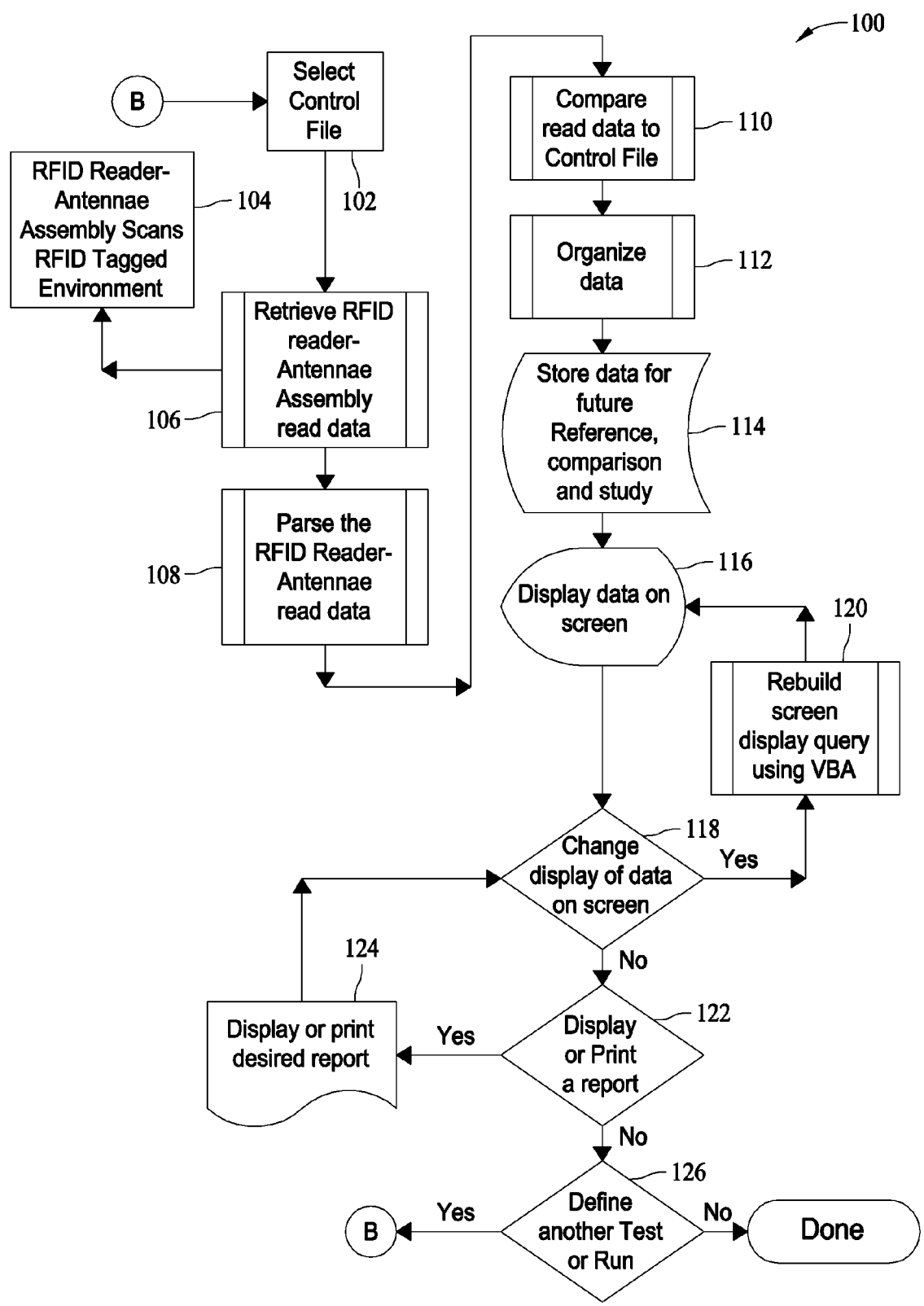
FIG. 3 is a flowchart a method associated with the RFID tag read verification system.

FIG. 3 is a flowchart 100 that illustrates a method for operating RTRV system 10 (shown in FIG. 1). Specifically, a control file is selected 102 from among several control files stored within database 16. The RFID reader 12 and antenna assembly 14 is then utilized to scan 104 an environment that contains a number of RFID tags. The read data received by RFID reader 12 during the scan 104 is then retrieved 106, for example, by processing device 18 (shown in FIG. 1).

Processing device 18 is configured to parse 108 the read data received by RFID reader 12 and then compare 110 the read data against the selected 102 control file. The results of the comparison are then organized 112 and stored 114 for future reference, comparison and study. The results of the comparison may be displayed 116 on a screen associated with processing device 18, which is operable for changing 118 the display of data on the screen, the display being rebuilt 120 upon such a selection. When the display is in a configuration acceptable to the user, they may choose 122 to display or print 124 a report or otherwise select 126 another control file for another survey of RFID tags.

In an exemplary embodiment, RTRV system 10 incorporates a Microsoft Access based database using extensive Visual Basic for Applications (VBA) routines to automate the various functions of system 10. As described above, system 10 allows for either manual input or the import of a spreadsheet to create a control table database (e.g., a control file) of as many RFID tags as are to be scanned or tested. In an embodiment, this control table also includes the following data: a four character tag ID code, the tag type, a code representing the item tagged, the location of the item tagged, the item serial number (if applicable), and the item's inspection date (if applicable).

As many scan tests as needed against an individual control file may be conducted as in a typical environment RFID tags get exchanged and the position of a tag on an item may be changed. When a test is completed, the RFID read information is placed into a text file and read directly into the processing device 18 of RTRV system 10 where the data is parsed and matched against the control file from the database 16. System 10 is configured to provide the results of any test giving statistics of, for example, read tags, tags not read (e.g., tags in the control file that should have been read), and tags that were read but not in the control file. In one embodiment, the various results of a tag read (the read status) for an individual RFID tag are color coded on the display of system 10 for easy identification. System 10 is configured to allow manipulation of test results by tag vendor, tag type, tags read, tags not read, and tags read but not in control file while also providing the capability of producing a full compliment of reports for documenting the results of testing.

In one specific embodiment, system 10, and specifically database 16 is configured to includes a number of tables, specifically:

a master tag file description table which is a listing of each master file number and description, a master tag file table which is a listing of all master file numbers, tag ids, tag type, item code, location of tag on item, item serial number, date item due inspection, a tag type table which is a listing of each tag by vendor and description, an item codes table which is a listing of all possible item classes with a code, description and the number items in the class, a test description table which is a listing of test name, test description, and test date, two transfer tables which are used as holding tables for the imported data from spreadsheets and data received from RFID readers (data in these tables is extracted and formatted before appending to the master or test records tables), a system drive table which holds the logical drive designation from which system 10 is running, and four test archive record tables which capture, for each scan performed by reader 12: the tags read and listed in master file tag file for test, the tags not read but listed in master file tag file for test, tags read but not listed in master file tag file for test, and tag read statistics for use in summary reports.

For the tags read and listed in master file tag file for test, information captured includes, for example, a test name, tag id, tag type, tag status, item description, location of item, location on item where tag placed, serial number of item, date item due inspection, number of reads, and which antenna of reader 12 read the tag. For the tags not read, but listed in master tag file for test, the captured information includes, for example, a test name, tag id, tag type, tag status, item description, location of item, location on item where tag placed, serial number of item, and date item due inspection. For the tags read, but not listed in master file tag file for test, the information includes a test name, tag id, tag status, number of reads, and the antenna that read the tag.

System 10 provides benefits to an entity due to the accuracy and speed at which a specific test of RFID tags can be verified while still being a relatively simple system to use. System 10 is fast and accurate in comparing RFID reader data to the specified control data. In current applications, control tables are copied into notebooks and each test is manually recorded after deciphering the comma delimited strings of data from the RFID reader. Another benefit afforded by system 10 is the archival and reporting feature. In such an embodiment, complete results of each test are kept for later reporting and comparison; thus, a complete audit trail of all testing and the derived conclusions from those tests is preserved for later audit and validation.

In an embodiment, system 10 is menu driven for easy navigation. If any reports are required that are not part of the standard suite, anyone with knowledge of the Microsoft Access query by example (QBE) capability can define the data required and, using the Microsoft Access Report builder screen, build a custom report.

In one specific embodiment, system 10, provides access to database 16 through one of twelve forms for the easy entry of data and system navigation. The first form, 00, allows for entry into the system. A second form, 01, allows a user access to the master tag file for manual data entry and editing. A third form, 02, allows a user to create and edit tag types. A fourth form, 03, allows a user to define and edit items. A fifth form, 04, and a sixth form, 05, which is a sub-form of 04, allows a user to import and display test data, provides access to master tag files and test records, and allows for the printing of reports. A seventh form, 06, allows a user to designate a logical drive for the operation of the programs associated with system. An eighth form, 07, is a master tag file creation form, allowing import of spreadsheet data, and repopulation of a spreadsheet with modified data, and further allows access to form 01. A ninth form is, 08, is for definition and editing of the RFID tests. Form 09, and sub-forms 10 and 11 are utilized for a flash summary report of test results, specifically, a list of all tag read results by item tagged, and a list all tag read results by tag type.

As mentioned above, utilization of RTRV system 10 allows for verification of RFID processes where a control file of known tag IDs, together with the other data elements that make up the control file can be provided. RTRV system 10 also greatly decreases the time to verify that all items (e.g., safety equipment) are onboard an aircraft or any other environment where RFID tags are used and there is a sufficient record of that use. In one practical example, maintenance personnel no longer have to reach under each seat to verify if a life vest is there for an entire aircraft cabin. Rather, a control file for an aircraft is created, manually, via import, or from a prior scan. Then reader 12 is turned on and moved down an aisle of the aircraft. The data read from the RFID tags is then downloaded into the computing device 18 of system 10 and in seconds the user knows what items are in the aircraft, what items are not in the aircraft, and what items are in the aircraft, but not in the control file. Additionally the data within system 10 is usable for location and identification of incongruent tag numbers, display missing RFID tag numbers, updating of the configuration file, and dating and time stamping the new control file configuration.

In another embodiment, the control files within RTRV system 10 also include inspection dates for each tagged item in the control file. In a specific embodiment, these inspection dates are color coded, when displayed via a user interface of computing device 18, to show the inspection date's proximity to the date of the latest scan by RFID reader 12. For example, items scanned within 15 days or less of a past inspection date are highlighted by red, 16 to 30 days are highlighted by orange, and 31 to 60 days are highlighted by yellow. Items scanned where their inspection due date is not within, for example, 60 days of the scan date, are highlighted by white. This color coding alerts the mechanic of an item needing inspection at the time of the scan or it allows for the decision to do an inspection now since at the time of the next scan, the item may be past its inspection date.

As mentioned above, one embodiment of RTRV system 10 utilizes a special, four character code to represent the complete RFID number. in the embodiment, the four characters are the last four characters of the complete RFID number. The four character configuration makes the building of control files much easier and less likely to include any errors. The four character code is then also used as a linking field between the data coming from the reader and the control file. An import routine for RFID reader data running, for example, on computing device 18, includes code to parse the final four characters from the RFID number to create the four character linking field.

For any given control file, any number of unique test records can be set up, up to the memory limit of, for example, the program managing the control file database. For each test record (data received from RFID reader 12), the absolute configuration of the control file and the results of the test are captured; thus preserving all the facts and data of each test for reporting, auditing and study purposes. Other features of RTRV system 10 are that most of the functions of the system are automated, thus requiring a minimal of instruction to use the system effectively. Examples include, the display of data by building queries, based on user input, on-the-fly is used extensively throughout the system. Delete and append functions are, for the most part, carried out using queries that are called within the specified routines. Import of control files and RFID reader data only requires an input of the specific file name to be imported. All import specifications have been created and are called by the code.

System 10, as described herein, may be utilized to significantly reduce the time needed to verify that a set of known RFID tagged items are in their respective designated locations. This functionality, is provided in part, as system 10 is operated through a set of linked forms, displayed on a user interface of computing device 18, which are populated with input boxes, function buttons and navigation buttons. Such a configuration makes operation of system 10 intuitive, and as such, a large amount of training on use is typically not needed. In a specific embodiment, underlying each linked form, as required, is Visual Basic for Applications (VBA) code that carries out each of the desired functions based on the criteria entered into the input boxes and the function buttons executed. Depending on the specific function to be performed, the VBA code parses, deletes, appends, counts, manipulates and displays the data in formats that allows the user to readily determine the effectiveness of the RFID tagging and reading process being tested. Additionally, system 10 is configured to archive, in its exact configuration, the control data and the test results for later comparison, audit and reporting.

In the embodiment, RTRV system 10 utilizes a single, stand-alone software program, as all data tables (e.g., control files) are part of the single application. If system 10 is enhanced or utilized in a multi-user environment, the control files are separated from the forms, queries, reports and code creating a front-end and back-end to system 10. This front-end and back-end approach allows for modifications to be made to the system forms, queries, reports and code without disturbing the back-end tables or interrupting use of the system while updates are being made.

RTRV system 10 is a significant asset to any entity doing RFID pilot testing to verify their processes and to entities where continuous configuration control is required on critical items.

In a practical example, in a large aircraft, if all life vests were tagged, physical verification would no longer be necessary. A simple file of all tag numbers, the items tagged, the tagged items' locations, etc. is uploaded into database 16 of system 10. When inspection is necessary, portable RFID reader 12 and antenna assembly 14, perhaps mounted on a cart, are moved down the aisle of the aircraft. As the RFID tags near the aisle are activated and begin transmitting, RFID reader 12 receives these signals and concurrently, or at a later time, imports the results into computing device 18 for storage in database 16. Once the scanned data is received by computing device 18, a complete record of what was read, what was not read, what was read but not in the control file and inspection date alerts, if any, is quickly provided to a user, for example, displayed on a screen associated with the computing device 18.

In an alternative embodiment, the essential software utilized within RTRV system 10 is built into an existing configuration control system. When a scan of a particular class of items (e.g., safety equipment) is performed, the RFID reader data is then imported into the configuration control system. RTRV algorithms are then used to manipulate the RFID reader data and compare it with the applicable configuration table. Display and reporting functions make the data available to users for evaluation and decision making.

While the invention has been described in terms of various specific embodiments, those skilled in the art will recognize that the invention can be practiced with modification within the spirit and scope of the claims.

What is claimed is:

1. A method for operating an RFID tag read verification system, the system including at least one RFID reader and antenna assembly and a computing device, said method comprising:
   selecting a control file for a specific RFID tagged environment from a plurality of control files stored within a database;
   importing the control file, including data relating to a plurality of RFID tagged items that collectively form the RFID tagged environment, into the computing device;
   scanning the RFID tagged environment utilizing the at least one RFID reader and antenna assembly;
   transferring scan data of the RFID tag environment from the at least one RFID reader and antenna assembly to the computing device;
   translating delimited read records created by the at least one RFID reader that make up the scan data; and
   utilizing the computing device to compare the translated scan data to the control file to identify any anomalies within the RFID tagged environment.

2. A method according to claim 1 wherein importing the control file comprises at least one of importing the control file from a database or spreadsheet application, manually keying the control file into the computing device through a user interface, and building up a control file up using scans of RFID tags within a defined environment.

3. A method according to claim 1 wherein importing the control file comprises importing data relating to at least one of RFID tag numbers, description of items tagged, a location of the RFID tag on each item, a serial number for each tagged item, and an inspection date for each RFID tagged item.

4. A method according to claim 1 wherein utilizing the computing device to compare the scan data to the control file comprises:
   parsing the translated scan data into relevant components; and
   comparing the parsed, translated scan data against the control file.

5. A method according to claim 4 wherein comparing the parsed, translated scan data against the control file comprises:
   determining which of the RFID tags thought to be in the RFID tag environment were scanned;
   determining which of the RFID tags thought to be in the RFID tag environment were not scanned; and
   determining which of the scanned RFID tags were not included in the control file.

6. A method according to claim 1 further comprising at least one of:
   displaying the scan data and control file comparison on a screen of the computing device according to user defined parameters;
   generating a report of the scan data and control file comparison according to user defined parameters; and
   storing at least one of the scan data and the scan data and control file comparison in the computing device for future use.

7. A method according to claim 1, wherein selecting the control file comprises selecting the control file from a plurality of previously imported control files.

8. A method according to claim 1 wherein the RFID tag environment is an aircraft.

9. A method according to claim 1 wherein the RFID tag environment is a cabin of an aircraft.

10. A method according to claim 1 further comprising updating contents of the control file based on the comparison of the scan data to the control file.

11. A method according to claim 1 wherein the RFID tag environment is one of a warehouse, distribution center or stockroom.

12. A method according to claim 11 wherein importing the control file comprises importing data relating to at least one of RFID tag numbers, an item SKU number for each item tagged, and a use before date for each RFID tagged item.

13. A method according to claim 11 further comprising using the comparison data to update inventory records.

14. A method according to claim 1 wherein the RFID tag environment is a mobile inventory of tools and repair parts including at least one of a maintenance cart and a maintenance vehicle.

15. A method according to claim 14 wherein importing the control file comprises importing mobile inventory data relating to at least one of RFID tag numbers, an item number for each item tagged, a serial number for each item tagged, and an issue date and vehicle number for each RFID tagged item.

16. A method according to claim 14 wherein comparing the scan data to the control file further comprises determining which tools and repair parts are no longer in the inventory.

17. A method according to claim 14 wherein comparing the scan data to the control file further comprises verifying all required tools and repair parts are in the mobile inventory.

18. A method according to claim 1 wherein utilizing the computing device to compare the translated scan data to the control file comprises:
   comparing an inspection date within the control file to an inspected date received from an RFID tag of an RFID tagged item; and
   indicating, via a user interface, whether an inspection for the RFID tagged item is past due, is currently due, is due within a specified time period, or is due at a time after the specified time period.

19. An RFID tag read verification system comprising:
   at least one RFID reader and antenna assembly operable to scan an RFID tagged environment to generate scan data;
   a database storing a plurality of control files for a plurality of RFID tagged environments; and
   a computing device comprising a control file selected from the plurality of control files by a user, said computing device operable to communicate with said at least one RFID reader and antenna assembly at least for reception of delimited scan data therefrom, the selected control file including data descriptive of the RFID tagged environment, said system operable to translate the delimited scan data and compare the translated scan data received from said at least one RFID reader and antenna assembly to the control file data to provide a status for the RFID tagged environment.

20. An RFID tag read verification system according to claim 19 wherein the selected control file comprises at least one of:
   one or more files imported into said computing device from a database or spreadsheet application;
   one or more files manually keyed into said computing device through a user interface; and
   one or more files built up through scans of RFID tags within the RFID tagged environment.

21. An RFID tag read verification system according to claim 19 wherein the selected control file comprises data relating to at least one of RFID tag numbers, description of items tagged, a location of the RFID tag on each item, a serial number for each tagged item, and an inspection date for each RFID tagged item.

22. An RFID tag read verification system according to claim 19 wherein to compare the translated scan data received from said at least one RFID reader and antenna assembly to the control file data, said computing device is operable to parse the received scan data into relevant components for comparison against the control file data.

23. An RFID tag read verification system according to claim 19 wherein to provide a status for the RFID tagged environment, said computing device configured to utilize the comparison of the translated scan data to the control file data to:
   determine which of the RFID tags thought to be in the RFID tagged environment were scanned;
   determine which of the RFID tags thought to be in the RFID tag environment were not scanned; and
   determine which of the scanned RFID tags were not included in the control file.

24. An RFID tag read verification system according to claim 19 wherein said computing device is configured to provide at least one of:
   a display of the scan data and control file data comparison on a user interface of said computing device;
   a report of the scan data and control file comparison, the report according to user defined parameters; and
   storage for at least one of the scan data and the scan data and control file data comparison for future use.

25. An RFID tag read verification system according to claim 19 wherein said computing device is operable to update data within the selected control file based on the received scan data.

26. An RFID tag read verification system according to claim 19 wherein the RFID tagged environment is one of a warehouse, distribution center or stockroom and data within the selected control file comprises data relating to at least one of RFID tag numbers, an item SKU number for each item tagged, and a use before date for each RFID tagged item.

27. An RFID tag read verification system according to claim 19 wherein the RFID tagged environment includes a mobile inventory of tools and repair parts and data within the selected control file comprises data relating to at least one of RFID tag numbers, an item number for each item tagged, a serial number for each item tagged, and an issue date and vehicle number for each RFID tagged item.

28. An RFID tag read verification system according to claim 27 wherein the status for the RFID tagged environment comprises data indicative of which tools and repair parts are no longer in the inventory.

29. An RFID tag read verification system according to claim 27 wherein the status for the RFID tagged environment comprises data indicating all required tools and repair parts are in the mobile inventory.

* * * * *